United States Patent [19]

Ackerman et al.

[11] 3,843,643

[45] Oct. 22, 1974

[54] PROCESS FOR THE RECOVERY OF FORMALDEHYDE AND PHENOL CONTAINED IN WASTE WATERS

[75] Inventors: Jacob Ackerman, Gorla Minore; Pierino Radici, Turate, both of Italy

[73] Assignee: Società Italiana Resine S.I.R. S.p.A., Milan, Italy

[22] Filed: Dec. 21, 1972

[21] Appl. No.: 317,490

[30] Foreign Application Priority Data

Dec. 27, 1971 Italy .................................. 32952/71

[52] U.S. Cl. ............................................. 260/248.5
[51] Int. Cl. ............................................. C07d 55/52
[58] Field of Search .................................. 260/248.5

[56] References Cited

UNITED STATES PATENTS

| | | | |
|---|---|---|---|
| 2,588,826 | 3/1952 | Goodwin | 260/248.5 X |
| 2,618,665 | 11/1952 | Hess et al. | 260/248.5 X |

*Primary Examiner*—John M. Ford
*Attorney, Agent, or Firm*—Sughrue, Rothwell, Mion, Zinn & Macpeak

[57] ABSTRACT

Formaldehyde and phenol are recovered from waste liquors, with purification of the liquors, by addition of ammonia to the formaldehyde liquor to form hexamethylene tetramine, evaporation of water, addition of the concentrate to the phenol liquor, and recovery of the hexamethylene tetramine/phenol adduct formed.

5 Claims, No Drawings

PROCESS FOR THE RECOVERY OF FORMALDEHYDE AND PHENOL CONTAINED IN WASTE WATERS

The present invention relates to the recovery of formaldehyde and phenol contained in industrial waste waters.

More particularly, the invention relates to a process for the simultaneous recovery, and in the form of useful products, of formaldehyde and phenol from discharge waters which contain the said products in quantities below approximately 10 percent by weight.

Waste solutions of this type are for example produced in industrial processes for the production of phenol or in processes for the production of paraformaldehyde and particularly in the phase wherein the commercial aqueous solutions of formaldehyde are subjected to concentration.

Waters which are thus polluted are also discharged in industrial processes for the production of resins from formaldehyde and phenol.

The virtually complete recovery and elimination of the chemicals contained in industrial waste is therefore an evermore pressing problem, both from the point of view of improving the industrial processes and by virtue of the need to reduce pollution and possibly to eliminate it altogether.

Therefore, the most desirable way of carrying out the recovery of chemicals from industrial waste consists in succeeding in eliminating the causes of the pollution, and at the same time improving the general economy of industrial processes.

The recovery of formaldehyde and phenol from dilute aqueous solutions which were mentioned at the outset can be carried out by fractional distillation of such solutions.

However, in view of the extent to which the liquid/vapour balance is dependent upon the conditions under which evaporation takes place, such as the temperature and rate of evaporation, the pH of the medium and the presence of possible extraneous products, an effective separation can be obtained only under conditions in which the process itself is extremely expensive.

Furthermore, separation of the water from the polluted products by distillation can be facilitated by chemical blockage of the formaldehyde and of the phenol, the term chemical blockage meaning the conversion of formaldehyde and phenol to products of low volatility.

A process of this type may for example have interesting aspects when it causes the reaction between formaldehyde and phenol without the use of different reagents.

For example, it is possible to cause formaldehyde to react with phenol to produce resol phenolic resins which can easily be concentrated by distillation of the water.

We note that the conditions under which such reaction takes place are not greatly disadvantageous and furthermore it is possible to achieve a very high recovery of both formaldehyde and of phenol when certain proportions between the reagents are observed.

However, such a process does not allow the recovery of resol phenolic resins which can be commercially exploited.

This fact must be brought into relation with the particular nature of the aqueous solutions which are subjected to the treatment and in particular the high dilution of the said solutions.

In fact, in order to achieve these conditions, particularly the pH of the medium, which are necessary to bring about the reaction between formaldehyde and phenol, relatively large quantities of basic catalyst and generally sodium hydroxide are required.

As a result, the resol phenolic resins obtained after separation of the water have a catalyst content which is so high as to render any practical utilisation virtually impossible. In the simultaneous recovery of formaldehyde and phenol from the relative aqueous waste solutions by blockage with a common reagent for such substances, followed by distillation of the water, those difficulties which derive from the strong dilution of the aqueous solutions which are treated are still encountered.

Thus, no processes for the recovery of formaldehyde and phenol from industrial waste waters are known which satisfy all the following conditions:

1. low cost of blocking reagent;
2. the operations required for the blocking and separation reactions are not unfavourable;
3. the quantity of formaldehyde and phenol recovered is very high;
4. the products remaining after separation of the water are expensive and the value of such products may possibly be equal to or greater than the cost of recovery.

A process has now been found which satisfies all the conditions stipulated above at the same time and so makes it possible to overcome the drawbacks inherent in those processes in which the formaldehyde and the phenol contained in waste waters are caused to react with each other, or in which a common reagent is used for the blocking of the said phenol and formaldehyde.

Therefore, an object of the present invention is a process for the separation of phenol and formaldehyde and the production of non-polluted waters from aqueous waste solutions which contain phenol and formaldehyde in quantities of less than approximately 10 percent by weight.

Another object of the present invention is a process for the recovery, in the form of useful products, of the phenol and formaldehyde contained in the said solutions.

A further object of the present invention is a simple and economically convenient process for the said recovery.

The said objects are achieved by the process of the present invention which consists essentially in blocking the phenol contained in the waste waters by a suitable reagent, the said reagent being constituted by the product of chemical transformation of the formaldehyde contained in the relative waste waters.

More particularly according to the process of the present invention, the formaldehyde contained in the dilute aqueous waste is first converted to hexamethylene tetramine by ammonia reaction. The hexamethylene tetramine, possibly after separation of water or a fraction of the water, is used to block the phenol contained in the relative waste waters, in the form of hexamethylene tetramine-phenol adduct.

Finally, the said adduct is separated from the water.

By means of the process of the present invention, firstly the waste waters containing formaldehyde and phenol are decontaminated in a simple and economical way; in addition, ammonia is used for blocking of the formaldehyde, and ammonia is a low-priced product.

In addition, by using the process of the present invention, virtually all the formaldehyde is recovered and a very considerable amount of phenol is recovered from the waste waters.

Finally, the hexamethylene tetramine-phenol adduct may be used as it is or it may be broken down into its individual components, so that in either case it is a useful product.

Therefore, all those conditions which are desirable in processes for recovering chemical substances from waste water are satisfied.

The aqueous waste solutions which are treated according to the process of the present invention normally contain phenol in concentrations of 0.01 to 5.0 percent by weight, while the concentration of formaldehyde is generally between 0.5 and 10 percent by weight.

According to the process of the present invention, ammonia or an aqueous solution of ammonia is added to the aqueous waste solution containing the formaldehyde, so as to ensure a molar ratio of formaldehyde to ammonia of approximately 1.5:1 in the reaction medium.

When working at ambient temperatures (20° to 25°C), hexamethylene tetramine forms almost immediately, with a virtually complete reaction of the formaldehyde and ammonia.

From the resultant aqueous solution of hexamethylene tetramine, the water is evaporated so as to obtain separation of the solid hexamethylene tetramine, or an aqueous solution with a concentration of hexamethylene tetramine equal to or greater than 64 percent by weight.

Evaporation may be carried out at ambient pressures with any type of apparatus suitable for the purpose, although it is generally preferred to work at a pressure of 30 to 150 torr, with a rapid evaporation of the water, such as for example by applying the technique of instant distillation or thin layer distillation.

Solid hexamethylene tetramine or the relative concentrated aqueous solution obtained in the manner described can be added to the aqueous waste solution containing the phenol in order to form an adduct between the phenol and the hexamethylene tetramine.

In particular, in this phase, the temperatures exceed that at which the medium solidifies, up to a maximum of 60°C, a molar ratio of hexamethylene tetramine to phenol of 0.5:1 to 3:1 being maintained. In the formation of adduct, the working times range from a few minutes (for example 2 minutes) up to a few hours (for example 2 hours).

The adduct is finally separated for example by filtration and may be used as such or may be decomposed into its individual components.

EXAMPLE 1

To an aqueous waste solution containing dilute formaldehyde is added, with agitation, an aqueous ammonia solution at the rate of 20 percent by weight, the process being conducted at ambient temperatures (approximately 20°C).

The aqueous ammonia solution is dispensed in such a way that the molar ratio of formaldehyde to ammonia is equal to 1.5:1.

1600 g of the resultant solution, with a formaldehyde titre equal to 2.0 percent by weight and an ammonia titre equal to 0.755 percent by weight, are placed in the boiler of a thin layer rotary laboratory evaporator with a capacity of 2000 ml.

97.6 percent by weight of the medium is distilled at 80°C by a thermostatically controlled oil bath, at a pressure of 120 torr.

The residue of distillation consists of an aqueous solution at the rate of 64.5 percent by weight of hexamethylene tetramine.

The distilled water, in a quantity equal to 1561.6 g, has a formaldehyde content equal to 0.05 percent by weight and an ammonia content less than 0.004 percent by weight.

EXAMPLE 2

To 750 g of an aqueous waste solution of formaldehyde containing 5 percent by weight of formaldehyde, are added 70.8 g of aqueous ammonia solution containing 20 percent by weight of ammonia. In this way, the molar ratio of formaldehyde to ammonia is equal to 1.5:1.

The addition is furthermore carried out at ambient temperature (approximately 20°C), the medium being maintained under agitation.

The solution obtained, with a pH equal to 7.1, is placed in a boiler with a capacity of 1000 ml, of a suitable laboratory type thin layer evaporator, followed by evaporation at a pressure of 120 torr and a temperature of 80°C at the base.

94 percent by weight of the solution is distilled. The distilled fraction has a formaldehyde content equal to 0.02 percent by weight and an ammonia content below 0.004 percent by weight.

Subsequently, distillation is continued at 40 torr, a temperature equal to 80°C still being maintained at the base in order to produce precipitation of hexamethylene tetramine.

At the end of distillation, 29.03 g powdered hexamethylene tetramine are recovered with a purity better than 99 percent.

EXAMPLE 3

To 1000 of a waste aqueous solution containing 5.46 percent by weight of phenol are added, while the mixture is being stirred, 38.4 g of hexamethylene tetramine obtained in a manner similar to that described in Example 2. The temperature of the resultant solution is gradually lowered to form a precipitate which increases with further cooling.

The suspension obtained is maintained for approximately 1 hour at a temperature between 0° and −1°C and under agitatation, after which it is filtered rapidly by means of a net fitted with a porous screen, immersed in the medium. The filtered solution has a phenol content equal to 0.72 percent.

EXAMPLE 4

To 1000 g of a waste aqueous solution containing 4.70 percent by weight of phenol are added 46.05 g of an aqueous solution (64.5 percent by weight) of hexamethylene tetramine obtained in the manner described in Example 1.

The addition takes place under slow agitation over 5 minutes, at ambient temperature, causing a white precipitate to form. A temperature of approximately 0°C is maintained for 1 hour by using a bath of ice and water.

After this period, the suspension is rapidly filtered over a porous screen filter.

The filtered product is washed with 50 ml cold water and then dried, the pressure being maintained at below ambient level.

In this way, 58.3 g of a dried product are obtained, in which the phenol content is equal to 65 percent by weight. This product is subsequently recrystallised from water with a yield of 80 percent and no variations in composition are observed following such recrystallisation.

EXAMPLE 5

To 1000 g of a waste aqueous solution containing 5.875 percent by weight of phenol, maintained at a temperature below 5°C by cooling with an ice and water bath are added 135.84 g of an aqueous solution of 64.5 percent by weight of hexamethylene tetramine obtained as described in Example 1.

The addition is carried out over a period of 20 minutes, slow agitation being maintained.

The suspension which forms is kept at the said temperature for approximately 30 minutes and then filtered on a porous screen filter.

The precipitate is washed with 70 ml of cold water and then recrystallised from water. In this way, 71.3 g of an anhydrous crystalline product are obtained. The filtered solution has a phenol content equal to 0.81 percent by weight.

What we claim is:

1. Process for the recovery of formaldehyde and phenol from aqueous waste solutions, and for the purification of such aqueous waste solutions, comprising:

a. adding ammonia or aqueous ammonia to an aqueous waste solution containing formaldehyde at an ambient temperature of 20° to 25°C to form hexamethylene tetramine, the molar ratio of formaldehyde to ammonia being approximately 1.5:1;

b. evaporating the water from the resulting aqueous solution of hexamethylene tetramine to form an aqueous solution with a concentration of hexamethylene tetramine of at least 64 percent by weight or to form solid hexamethylene tetramine;

c. adding said solid hexamethylene tetramine or said concentrated aqueous solution of hexamethylene tetramine to an aqueous waste solution containing phenol to form an adduct between the hexamethylene tetramine and the phenol, the temperature being between the setting temperature of the medium and approximately 60°C and the molar ratio of hexamethylene tetramine to phenol being 0.5:1 to 3:1; and d. recovering said hexamethylene tetramine-phenol adduct.

2. The process according to claim 1, wherein evaporation of the aqueous solution of hexamethylene tetramine is carried out at a pressure below ambient pressure.

3. The process according to claim 2, wherein the evaporation is carried out at a pressure of 30 to 150 torr.

4. The process according to claim 1, wherein the concentration of phenol and formaldehyde in said aqueous waste solution is less than approximately 10 percent by weight.

5. The process according to claim 4, wherein the phenol concentration is 0.01 to 5.0 percent by weight, and the formaldehyde concentration is 0.5 to 10 percent by weight.

* * * * *